Oct. 16, 1934.   J. B. LOUIS   1,977,486
COMBINATION OVEN AND ROASTING PAN
Filed April 10, 1933   2 Sheets-Sheet 2
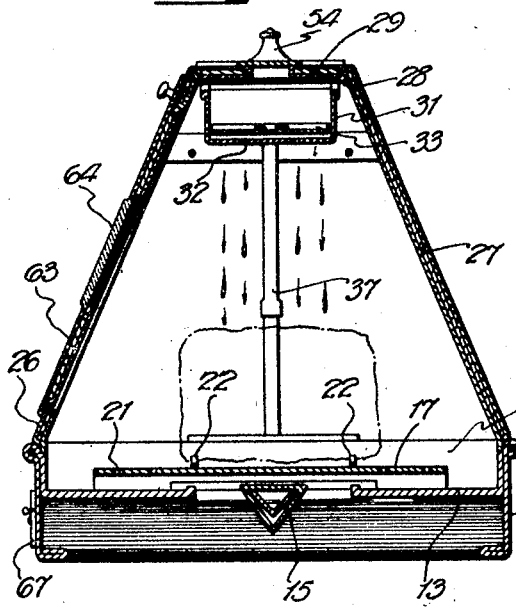
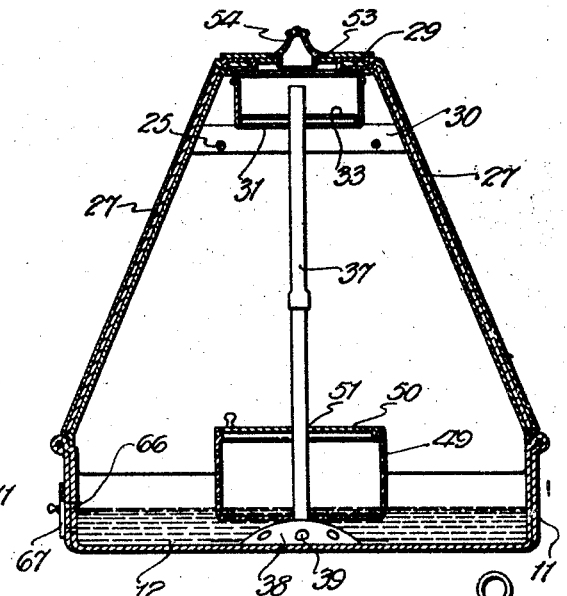
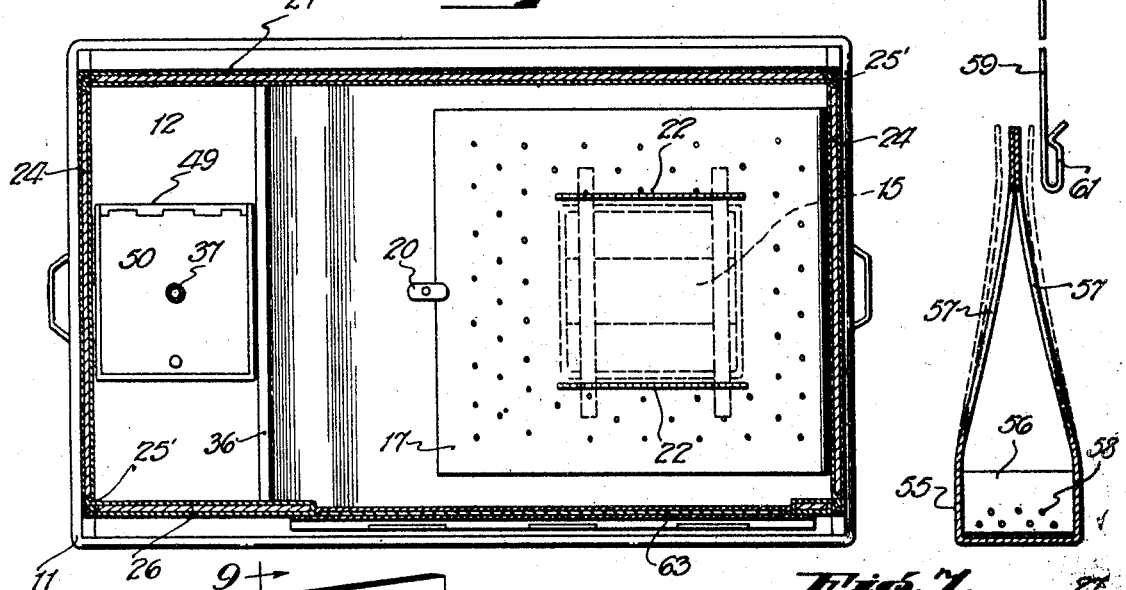
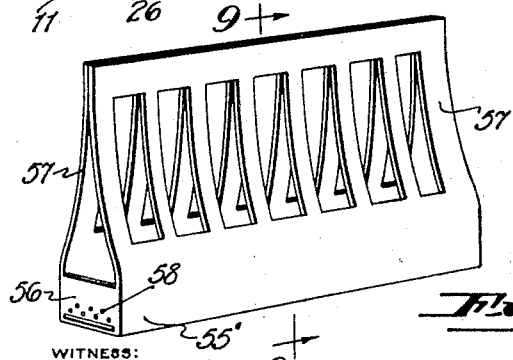
INVENTOR
JOHN B. LOUIS.
BY
Ely & Pattison
ATTORNEYS Patented Oct. 16, 1934

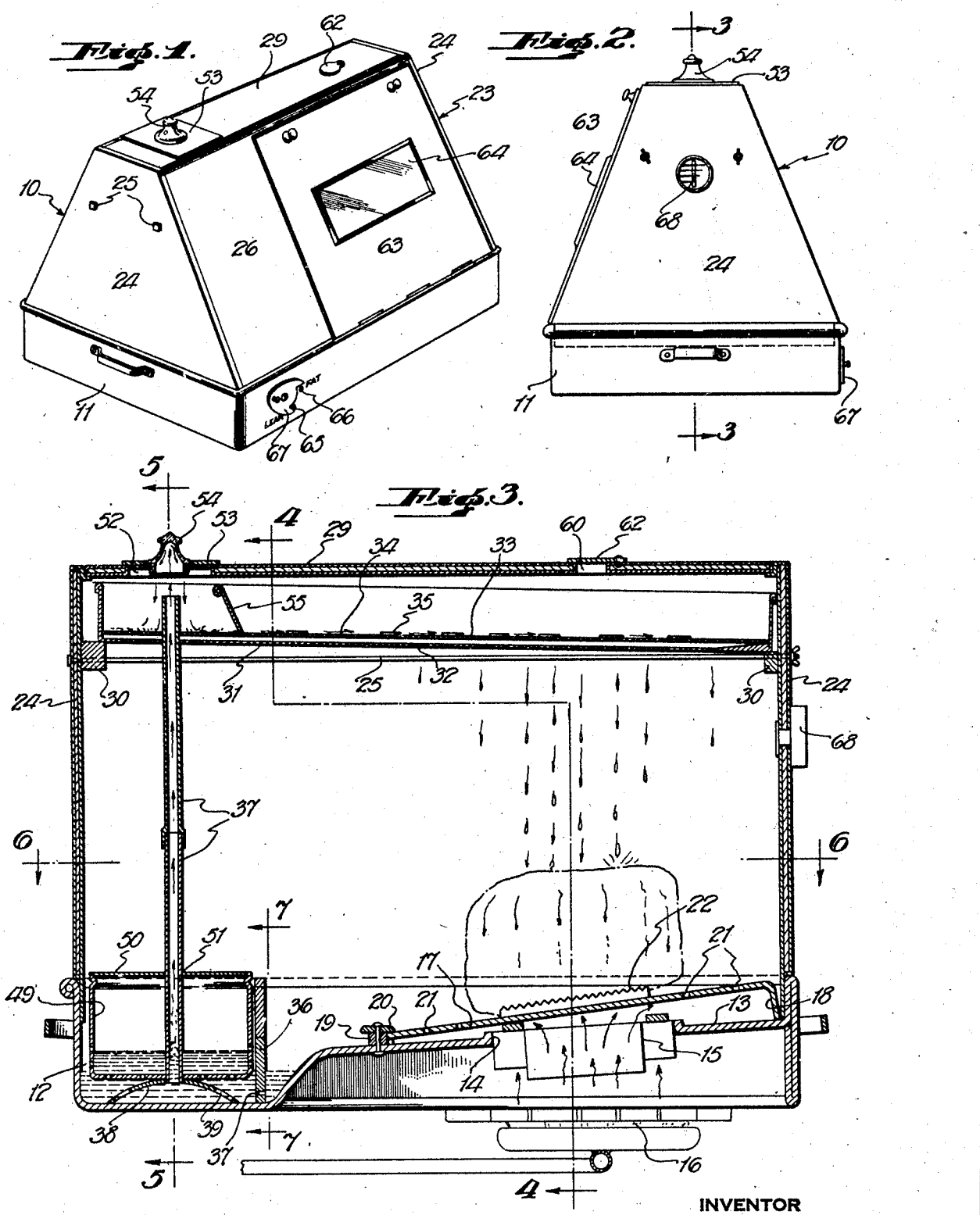

1,977,486

UNITED STATES PATENT OFFICE 1,977,486

COMBINATION OVEN AND ROASTING PAN

John B. Louis, Lawrence, N. Y.

Application April 10, 1933, Serial No. 665,275

7 Claims. (Cl. 53—6)

This invention relates to a combination oven and roasting pan.

One of the main features of the invention resides in a combined oven and roasting pan in which the meat or fowl to be cooked is automatically basted to assure the proper flavoring and cooking of the same, and eliminate the present practice of frequently opening the oven and manually basting the food. Thus, the meat or fowl to be cooked may be placed in the device and the heat set to a proper degree of temperature, and the same left to cook the required time without constant attendance of the cook or chef.

Another feature of the invention is to provide an automatic oven and basting pan in which the desired flavorings may be placed which are necessary for the cooking of various meats and fowls, and when mixed with the juices from the meat or fowl being cooked, the gravy is formed which is lifted by a system of percolation to continuously shower the same upon the meat or fowl during cooking to properly prepare the same for eating.

Another object of the invention is the provision of a combined percolator oven and roasting pan which is constructed in a novel manner to permit of the collapsing of the same when not in use to enable compact storing in small kitchens or kitchenettes where space is scarce.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a perspective view of the combination oven and roasting pan in set up position for use.

Figure 2 is an end elevational view.

Figure 3 is a vertical longitudinal sectional view on the line 3—3 of Figure 2.

Figure 4 is a vertical transverse sectional view on the line 4—4 of Figure 3.

Figure 5 is a vertical transverse sectional view on the line 5—5 of Figure 3.

Figure 6 is a horizontal sectional view on the line 6—6 of Figure 3.

Figure 7 is a detail vertical sectional view on the line 7—7 of Figure 3.

Figure 8 is a perspective view of the broiler attachment.

Figure 9 is a vertical transverse sectional view on the line 9—9 of Figure 8 and in association with the broiler actuating handle member.

Referring to the drawings by reference characters, the numeral 10 designates my improved combination oven and roasting pan in its entirety which includes a rectangular shaped pan or base section 11 having a gravy well or compartment 12 formed at one end thereof and an inclined bottom wall 13 extending downwardly from the opposite end of the pan in a direction toward the gravy well 12. The inclined bottom wall 13 is provided with a heat inlet opening 14 while supported by the bottom and disposed within the opening 14 are heat and flame baffles 15. In use, the oven is positioned over a source of heat such as the gas burner 16 of a gas range as shown in Figure 3 so that the opening 14 is directly above the burner to enable heat to enter the device.

Overlying the opening 14 and spaced therefrom is an inclined supporting plate 17 provided with a down-turned flange 18 at one end which rests upon the inclined bottom 13 while the opposite end of the plate abuts a fixed stop 19 attached to the bottom wall 13 and which plate is held in position by a turn button 20. The plate 17 inclines in the same direction as the bottom wall 13 but at a greater angle of inclination. The supporting plate 17 is provided with openings or perforations 21 to enable the heat to pass upwardly from beneath the plate and into the oven. The upper face of the supporting plate is provided with spaced parallel toothed racks 22 on which the meat or fowl to be cooked is placed and held against accidental sliding down the inclined plate 17. These racks are arranged so as to support the meat or fowl directly above the heat opening 14.

Removably fitting upon the pan or base section 11 is a cover section 23 which is of truncated cone shape in end elevation and is constructed of a plurality of demountable or separable walls. The cover section comprises end walls 24—24 held in spaced relation by brace rods 25. The inner faces of the end walls 24 are provided with grooves 25' for receiving the opposed marginal ends of the front and rear walls 26 and 27, respectively. Due to the shape of the end walls 24, the front and rear walls converge upwardly and the tops of the same are provided with flanges or seats 28 for removably supporting the top wall 29. It will be seen that after the front and rear wall are interfitted with the end walls 24 and the brace rods 25 secured in position, the said walls are locked together and form a rigid structure. In the drawings the walls forming the cover section are formed of two thicknesses of metal with a layer of insulation therebetween, but the same may be constructed of a single thickness of metal if desired. The outer sheet of metal terminates short of the marginal edges of the wall section to provide shoulders for supporting the cover section in position upon the top edge of the pan or base section 11.

Fixedly secured on the inner side of the end walls 24 are transverse cleats 30, the same being disposed on different planes, the cleats 30 on the wall adjacent to that end of the pan section provided with the gravy well being higher than the cleat 30 provided on the opposite end wall. The cleats 30 removably support a tray or trough 31 in an inclined position, the angle of inclination being opposite to the inclination of the bottom wall 13. The bottom of the tray or trough is provided with drip openings 32 while supported within the trough and in spaced relation to the bottom thereof is a false bottom 33 provided with drip openings 34, the said openings 34 being staggered with respect to the openings 32. V-shaped ridges 35 are provided on the upper face of the false bottom 33 and surround certain of the openings 34 to obstruct the flow of gravy down the inclined false bottom wall 33 to cause the same to drop through the openings 34.

Dividing the gravy wells 12 from the inclined bottom wall 13 of the pan section is a removable partition wall 36 provided with openings 37 adjacent the bottom thereof in order to establsh communication between the bottom of the pan section and the gravy well 12. Rising from the gravy well 12 to the inclined elevated trough 31 is a percolator device which consists of a pair of separable interfitting percolator tubes 37, the lower end of the bottom tube section being provided with a concavo-convex base 38 which rests upon the bottom of the well 12, the said concavo-convex base being provided with openings 39 to enable gravy to pass within the dome shaped chamber formed by the concavo-convex base when resting upon the bottom of the well. Fitting onto the lower tube section 37 is a perforated cup shaped seasoning holder 40, the same resting upon the base 38 whereupon it is supported in an elevated position within the gravy well 12. The cup shaped receptacle 49 is provided with a hinged cover 50 having a central opening 51 for the passage of the lower tube section 37. When the receptacle 49 is removed from the tube section, the cover 50 may be swung open and the receptacle filled with the necessary flavoring ingredients used in the preparation of gravy for the cooking of different meats and fowls.

The upper end of the top tube section 37 rises within the trough 31 while formed in the top wall 29 directly above the discharged end of the percolator tube is an opening 52 closed by a removable cover 53 in which is arranged a deflector member 54 against which the gravy discharged from the percolator tube is deflected downwardly into the gravy trough 31.

Pivotally mounted within the gravy trough 31 and normally resting in an inclined position upon the false bottom 33 is a gravity gate valve 55, the same being disposed adjacent the discharge end of the percolator tube.

In operation of the above described cooking device, assume that it is desired to roast a piece of meat or fowl. The combined oven and basting pan is placed upon the stove with the opening 14 directly over the source of heat. The gravy flavoring container 49 is filled with the desired flavoring material and if desired water may be placed in the well 12 for mixture with the other ingredients which form the liquid gravy.

As the meat or fowl is cooked, the juices therefrom flow down the inclined supporting plate 17 onto the inclined bottom wall 13 of the pan section and into the gravy well 12 through the opening 37 in the partition 36. The meat juices therefore mix with the flavoring materials contained within the receptacle 49, and when the mixture is sufficiently heated, the pressure therebehind forces the liquid gravy upwardly through the percolator tube 37 where it is discharged into the upper end of the inclined gravy trough 31. The gate 55 causes the gravy to back up at the high or top end of the gravy trough and when the pressure is sufficient to overcome the gravity of the gate valve 55, the said valve releases a quantity of the gravy which flows down the inclined gravy trough and through the openings 34 and 32 from where it drops in the form of a shower upon the meat or fowl being cooked. By reason of this percolating principle, a continuous circulation of the gravy is obtained, causing the meat or fowl to be automatically basted and which basting is essential to the proper cooking of the food.

In Figure 8 of the drawings there is shown a broiler attachment for the cooking of steaks, chops and the like which comprises a trough shaped base 55' having end walls 56, while rising upwardly from the side walls of the trough shaped base are inwardly curved resilient grille members 57 which normally abut each other adjacent their top edges. One of the end walls is provided with openings 58 for the flow of the meat juices during cooking. In the use of the grille member, the plate 17 is removed from the oven and the grille member placed in a position upon the bottom wall 13 to span the opening 14. In the cooking of steaks and chops, the gravy percolating system may not be needed, whereupon the gravy trough member 31 may be removed and when removed a broiler manipulating handle member 59 is inserted through an opening 60 provided in the top wall. The inner or lower end of the member 59 is provided with a hook 61 for hooking engagement with the grille members 57 of the broiler at the center thereof whereby the broiler member may be turned to various positions to assure even cooking of the meat. A closure plate 62 is provided for closing the opening 60 during roasting operation.

The front wall 26 is provided with a hinged door 63 which will enable access to the interior of the oven and provided in the door is a glass panel 64 by which a cook or chef may view the meat or fowl during the cooking thereof.

The front wall of the base or pan section 11 is provided with drain openings 65 and 66 which communicate with the well 12, the same being disposed at different levels and for closing the said openings or selectively opening either of the same there is provided a valve disk 67 which is turnably mounted upon the front wall of the pan section. By opening the higher drain opening 66, fat gravy may be drawn from a point adjacent the top of the gravy well and by opening the lower drain opening 65, a lean gravy may be drawn from the well.

A temperature indicator 66 is mounted in one of the end walls 24 of the cover section to indicate the temperature within the oven during use.

While I have shown and described what I deem to be the most desirable embodiment of my invention, I wish it to be understood that such changes as come within the scope of the appended claims may be resorted to if desired.

Having thus described the invention, what I claim as new and desire to secure by Letters Patent of the United States, is:—

1. In a cooking device of the class described, a pan section having an opening in the bottom thereof, a gravy well at one end of said pan section, an inclined supporting plate supported by and disposed within said pan section and overlying said opening in spaced relation thereto, said supporting plate being downwardly inclined in a direction toward said gravy well, a cover section supported by and rising from said pan section, and gravy percolating means for lifting gravy from said gravy well above said pan section and for causing the same to be dropped over the food adapted to be supported upon said supporting plate, said gravy percolating means including a perforated inclined gravy trough mounted in the top of said cover section, a percolating tube rising from said gravy well and entering said inclined gravy trough at the high end thereof, and a gravity gate within said inclined gravy trough adjacent the high end thereof for causing a backing up of the gravy when entering the trough until the amount is sufficient to open said gravy gate to enable the passage of the same down said inclined gravy trough.

2. In a cooking device of the class described, an oven having a bottom provided with an opening therein for the entrance of heat, a gravy well at one end of said oven, and an inclined supporting plate disposed above said opening and inclined in a direction toward said gravy well, and an inclined gravy trough supported within said oven above the bottom thereof and inclined in a direction opposite to the direction of inclination of said supporting plate, said trough having drip openings therein, and a percolator tube rising from said gravy well into said gravy trough, and a gravy deflector mounted in the top of said oven directly above the upper discharge end of said percolator tube.

3. In a cooking device of the class described, an oven having a bottom provided with an opening therein for the entrance of heat, a gravy well at one end of said oven, and an inclined supporting plate disposed above said opening and inclined in a direction toward said gravy well, and an inclined gravy trough supported within said oven above the bottom thereof and inclined in a direction opposite to the direction of inclination of said supporting plate said trough having drip openings therein, and a percolator tube rising from said gravy well into said gravy trough, and a perforated flavoring receptacle supported upon the lower end of said percolator tube and disposed within said gravy well.

4. A cooking device comprising a casing open at its top and having an inclined bottom wall and a gravy well at the low end thereof, an elongated gravy trough having drip openings therein, means on the vertical walls of said casing for removably supporting said gravy trough in an elevated inclined position, the angle of inclination of said gravy trough when in supported position being opposite to that of the inclined bottom wall, a percolating tube rising from said gravy well and entering said trough at the high end thereof, and a removable cover closing the open top of said casing.

5. A cooking device comprising a casing having an inclined bottom wall and a gravy well at one end thereof, an elevated inclined gravy trough supported within said casing and having drip openings therein, the angle of inclination of said gravy trough being opposite to that of said inclined bottom wall, a percolator tube rising from said gravy well to the high end of said inclined gravy trough, and a pivoted gravity drop gate in said trough adjacent the high end thereof whereby the flow of gravy from the top of said percolator tube may be checked until the pressure of the accumulation thereof is sufficient to overcome the gravity action of said gate to open the gate and allow the free flow of the accumulated gravy down said inclined gravy trough.

6. In a meat roasting cooking utensil, a pan having an inclined bottom, and a gravy accumulating well at the low end thereof, one side wall of said pan having two openings therein which open into said gravy well, one opening being disposed on a plane above the other, and a pivoted valve element mounted on said pan and common to both of said openings for normally overlying and sealing the same, but selectively movable to a position to uncover either of said openings whereby the contents of said gravy well may be drained off at various levels.

7. A cooking device including a casing having an inclined bottom wall and a gravy well at the low end thereof, an inclined gravy drip trough supported in an elevated position within said casing, a percolator tube having a concavo convex base and a tube rising therefrom to said gravy trough, and a perforated gravy flavoring receptacle telescoping said tube and resting upon said base whereby the contents of said flavoring receptacle may be subjected to the gravy adapted to accumulate in said gravy well.

JOHN B. LOUIS.